United States Patent
Horwath et al.

(10) Patent No.: US 8,657,694 B2
(45) Date of Patent: Feb. 25, 2014

(54) JACK SCREW CONNECTOR

(75) Inventors: William Allen Horwath, Tinley Park, IL (US); Thomas John Fairbairn, Dyer, IN (US); Edwin D. Slota, Lockport, IL (US)

(73) Assignee: Whiting Corporation, Monee, IL (US)

( * ) Notice: Subject to any disclaimer, the term of this patent is extended or adjusted under 35 U.S.C. 154(b) by 187 days.

(21) Appl. No.: 12/345,151

(22) Filed: Dec. 29, 2008

(65) Prior Publication Data
US 2009/0170615 A1  Jul. 2, 2009

Related U.S. Application Data

(60) Provisional application No. 61/018,406, filed on Dec. 31, 2007.

(51) Int. Cl.
*F16D 3/38* (2006.01)
(52) U.S. Cl.
USPC .......................................... 464/136
(58) Field of Classification Search
USPC .............. 464/11, 106, 112, 136, 119; 403/57, 403/156, 157; 81/177.7, 177.75; 254/85, 254/92, 103, 418
See application file for complete search history.

(56) References Cited

U.S. PATENT DOCUMENTS

| | | | | | |
|---|---|---|---|---|---|
| 1,185,199 | A | * | 5/1916 | Hauer | 464/119 |
| 1,442,921 | A | * | 1/1923 | Bockhoff | 464/136 |
| 1,566,849 | A | * | 12/1925 | Fox | 464/136 |
| 2,005,202 | A | * | 6/1935 | Pilger | 464/119 |
| 2,304,766 | A | * | 12/1942 | Pratt | 464/119 |
| 2,559,485 | A | * | 7/1951 | Warner | 464/136 |
| 2,826,052 | A | * | 3/1958 | Stillwagon, Jr. | 464/119 |
| 3,232,076 | A | * | 2/1966 | Sundt | 464/136 |
| 4,272,972 | A | * | 6/1981 | James | 464/136 |
| 4,702,724 | A | * | 10/1987 | Vater | |
| 5,286,130 | A | * | 2/1994 | Mueller | |
| 5,458,028 | A | * | 10/1995 | Cleveland, III | 464/136 |
| 5,496,219 | A | * | 3/1996 | Anspach et al. | 464/119 |
| 5,766,081 | A | * | 6/1998 | Desmarais | 464/119 |
| 6,234,907 | B1 | * | 5/2001 | Moser | |

(Continued)

FOREIGN PATENT DOCUMENTS

JP  2002-295430  10/2002

OTHER PUBLICATIONS

"Around". Dictionary.com. [online], [retreived on Mar. 6, 2012]. Retreived from the Internet <URL:http://dictionary.reference.com/browse/around>.*

(Continued)

*Primary Examiner* — Gregory Binda
*Assistant Examiner* — Josh Skroupa
(74) *Attorney, Agent, or Firm* — Brinks Gilson & Lione

(57) ABSTRACT

A jack screw connector includes a first clevis including a pair of first clevis legs, an eye block including a first bore and a second bore such that the first and second bores are formed substantially perpendicular to each other, a first pin configured to be supported within the first bore and rotably carried by the pair of first clevis legs when a first end of the eye block is carried therebetween, a second clevis including a pair of second clevis legs sized to engage a second end of the eye block, and a second pin configured to be supported within the second bore and rotably carried by the pair of second clevis legs when aligned therewith.

7 Claims, 3 Drawing Sheets

(56) References Cited

U.S. PATENT DOCUMENTS 6,287,206 B1 * 9/2001 Stage .......................... 464/136
6,656,053 B2 * 12/2003 Chang .......................... 464/119
6,902,341 B1 * 6/2005 Rauschert
2005/0229752 A1 10/2005 Nickipuck

OTHER PUBLICATIONS

"Bearing Lubrication Basics." Petron Plus. Sep. 15, 2005, [online], [retrieved on Oct. 15, 2012] Retrieved from the Internet <URL: http://web.archive.org/web/20050915014036/http://www.petronomics.com/bear_basics.htm>.*

"Surround." Dictionary.com. [retrieved on Oct. 15, 2012] Retrieved from the Internet <URL: http://dictionary.reference.com/browse/surround>.*

International Preliminary Report on Patentability from corresponding PCT/US2008/088521 dated Jul. 15, 2010.

* cited by examiner

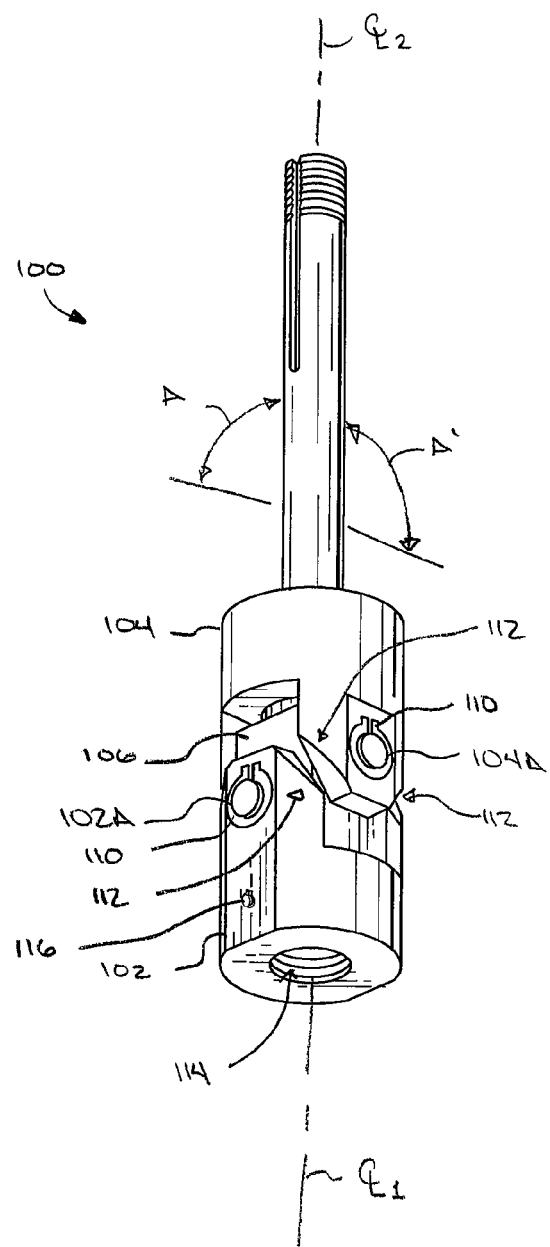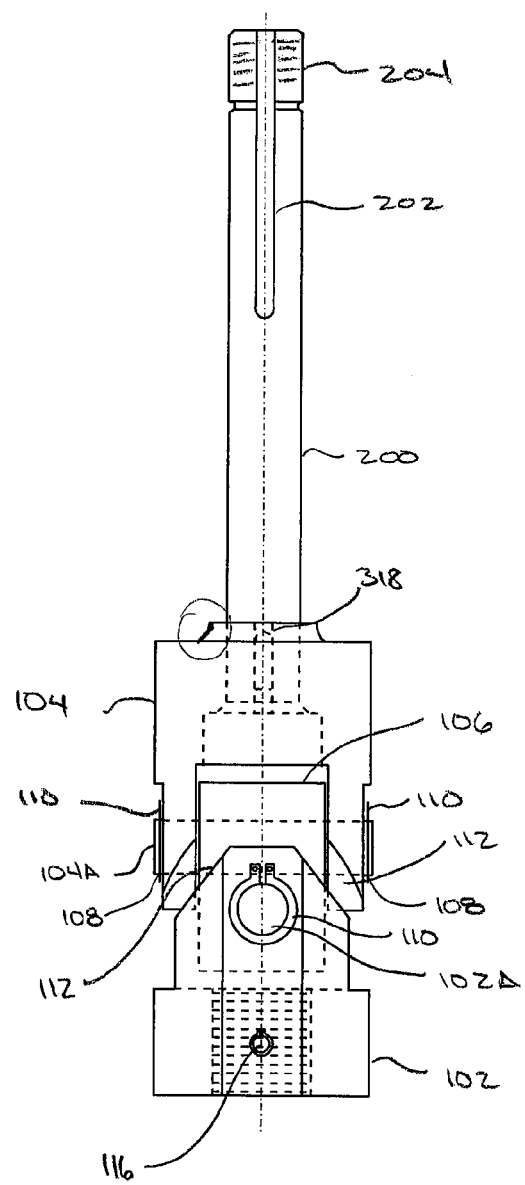

JACK SCREW CONNECTOR

CROSS-REFERENCE TO RELATED APPLICATIONS

This patent claims the priority benefit under 35 U.S.C. §119(e) of U.S. provisional patent application Ser. No. 61/018,406, titled "JACK SCREW CONNECTOR," filed on Dec. 31, 2007, the entire contents of which is hereby incorporated by reference.

TECHNICAL FIELD

This patent relates to car hoist systems and more particularly to a jack screw connector for use in a shallow pit car hoist system.

BACKGROUND

Car hoist systems may be designed or configured to include a wide selection of synchronized mechanical screw lift components, gear ratios, controls and power options. A typical car hoist system may be designed and configured to accommodate a variety of car types such as, for example, single units, married pairs and/or articulated cars. To accommodate and support the desired variety of car types, the car hoist system and component of the car hoist system can be adapted or arranged to support a wide range of lift heights, vehicle weights and dimensions.

Shallow pit car hoist systems are one type of car hoist system that may be utilized. A typical shallow pit car hoist system may operate and lift a vehicle with a pit depth of only three and a half feet (3'6"). The limited pit depth reduces excavation, construction and installation costs when compared to alternate deep pit designs. Moreover, the maintenance of the shallow pit car hoist system may be simplified when compared to alternate deep pit designs because the lifting screws may be housed in an oil-filled caisson that provides continuous oil bath lubrication to the screw and nut. This configuration protects the screw from environmental contamination and continuously lubricates the lifting screws thereby increasing the wear life of the nut and screw. The shallow pit car hoist system further offers additional protection to the system's individual components.

It would be desirable to provide a jack screw connector that may connect the lifting screws and drive mechanisms while allowing and/or compensating for any misalignment therebetween.

SUMMARY

The exemplary jack screw connector disclosed and discussed herein provides a flexible connection that accommodates lateral movement or misalignment between the lifting or jack screws and the moving components, drive mechanisms, etc. of the vehicle lift equipment. The exemplary jack screw connector is configured to transmit high axial loads in combination with a torque load to the lifting or jack screws which, in turn, actuate a lifting frame to raise the vehicle.

In one embodiment a jack screw connector is disclosed. The jack screw connector includes a first clevis including a pair of first clevis legs, an eye block including a first bore and a second bore, wherein the first and second bores are formed substantially perpendicular to each other, a first pin configured to be supported within the first bore and rotably carried by the pair of first clevis legs when a first end of the eye block is carried therebetween, a second clevis including a pair of second clevis legs sized to engage a second end of the eye block, and a second pin configured to be supported within the second bore and rotably carried by the pair of second clevis legs when aligned therewith.

In another embodiment a jack screw connector is disclosed. The jack screw connector includes a first connector, an eye block including a first bore and a second bore, wherein the first and second bores are formed substantially perpendicular to each other, a first pin configured to pivotably couple the first connector to the first bore of the eye block, a second connector sized to engage a second portion of the eye block, and a second pin configured to pivotably couple the second connector to the second bore of the eye block.

In another embodiment a jack screw connector is disclosed: The jack screw connector includes a first connector, a second connector aligned substantially perpendicular and substantially coaxial to the first connector, an eye block carried between the aligned first and second connector, wherein the eye block includes a first bore and a second bore formed substantially perpendicular to each other, a first pin configured to pivotably couple the first connector to the first bore of the eye block, and a second pin configured to pivotably couple the second connector to the second bore of the eye block.

Additional features and advantages of the disclosed embodiments are described in, and will be apparent from, the following Detailed Description and the figures.

BRIEF DESCRIPTION OF THE FIGURES

FIG. 1 illustrates a perspective view of an exemplary jack screw connector;

FIG. 2 illustrates a plan view of the exemplary jack screw connector shown in FIG. 1;

DETAILED DESCRIPTION

Figure 3:
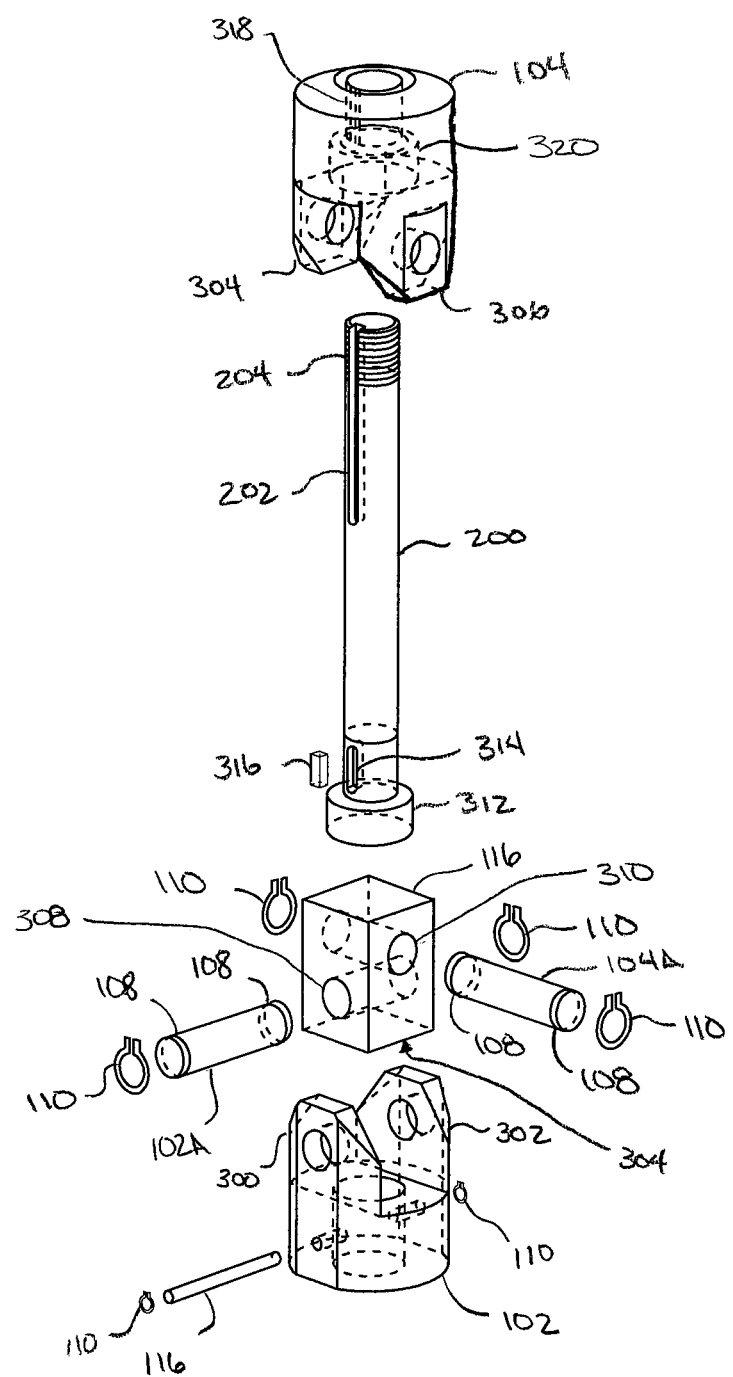
FIG. 3 illustrates an exploded perspective view of the exemplary jack screw connector shown in FIG. 1.

An exemplary jack screw connector disclosed and discussed herein provides a flexible connection that accommodates lateral movement or misalignment between the lifting or jack screws and the moving components, drive mechanisms, etc. of the vehicle lift equipment. The exemplary jack screw connector is configured to transmit high axial loads in combination with a torque load to the lifting or jack screws which, in turn, actuate a lifting frame to raise the vehicle.

One embodiment of an exemplary jack screw connector may be designed and configured to support, for example, a tensile load of eighteen thousand pounds (18,000 blbs) and may include a female threaded connector to engage or cooperate with two and seven-eighths inch (2⅞") diameter threads of a lifting or jack screw. Another embodiment of an exemplary jack screw connector may further include, opposite the threaded female connector, a bore for supporting a keyed rod for coupling to a gearbox. Another embodiment of an exemplary jack screw connector may further be coated utilizing a wear resistant and/or lubricating coating such as, for example, a MICROLON® 1052 coating provided by Mircosurface Corporation of Morris, Ill.

FIG. 1 illustrates a perspective view of an exemplary jack screw connector 100. The jack screw connector 100 includes a lower connector or clevis 102 and an upper connector or clevis 104 pivotably connected to or cooperating with an eye block 106. As used herein, the term connector or clevis describes a substantially U-shaped component configured or adapted to pivotably cooperate with the eye block 106. The eye block 106 supports a pair of orthogonally or transversely oriented, with respect to each other, shafts or pins 102A and 104A pivotably coupled to the devises 102, 104, respectively. The pins 102A and 104A each may be formed or manufactured with a pair of snap-ring grooves 108 (see FIG. 2) sized to accept a snap-ring 110. The eye block 106 supports and reinforces each of the shafts or pins 102A and 104A carried therein as well as each leg of the U-shape portion of the devises 102, 104 relative to the base of the U-shape. In this way, the eye block 106 may contain and/or prevent undo flexing of each of the shafts or pins 102A and 104A and minimize the torque applied to each leg of the U-shape portion of the devises 102, 104 as a load is applied thereto.

Each connector or clevis 102, 104 includes a chamfered or angled portion 112 formed at a distal end of each leg of the U-shape relative to the base of the U-shape. The chamfered portion 112 on each of the devises 102, 104 ensures or allows for a full range of motion relative to each of the devises 102, 104. For example, the upper clevis 104 may pivot about the pin 104A over a one hundred and eighty degrees (180°) as indicated by the arrows A and A'. Similarly, the lower clevis 102, which is arranged at a ninety degree (90°) orientation relative to the upper clevis 104, may pivot about pin 102A over one hundred and eighty degrees (180°). The combination and freedom of movement afforded between the pivotably coupled to devises 102, 104 provides for or allows for a connection to be established and rotatably maintained between a shaft (not shown) coupled along the rotational axis $CL_1$ associated with the lower clevis 102, and a device (not shown) coupled along the rotational axis $CL_2$ associated with the upper clevis 104.

Figure 4:
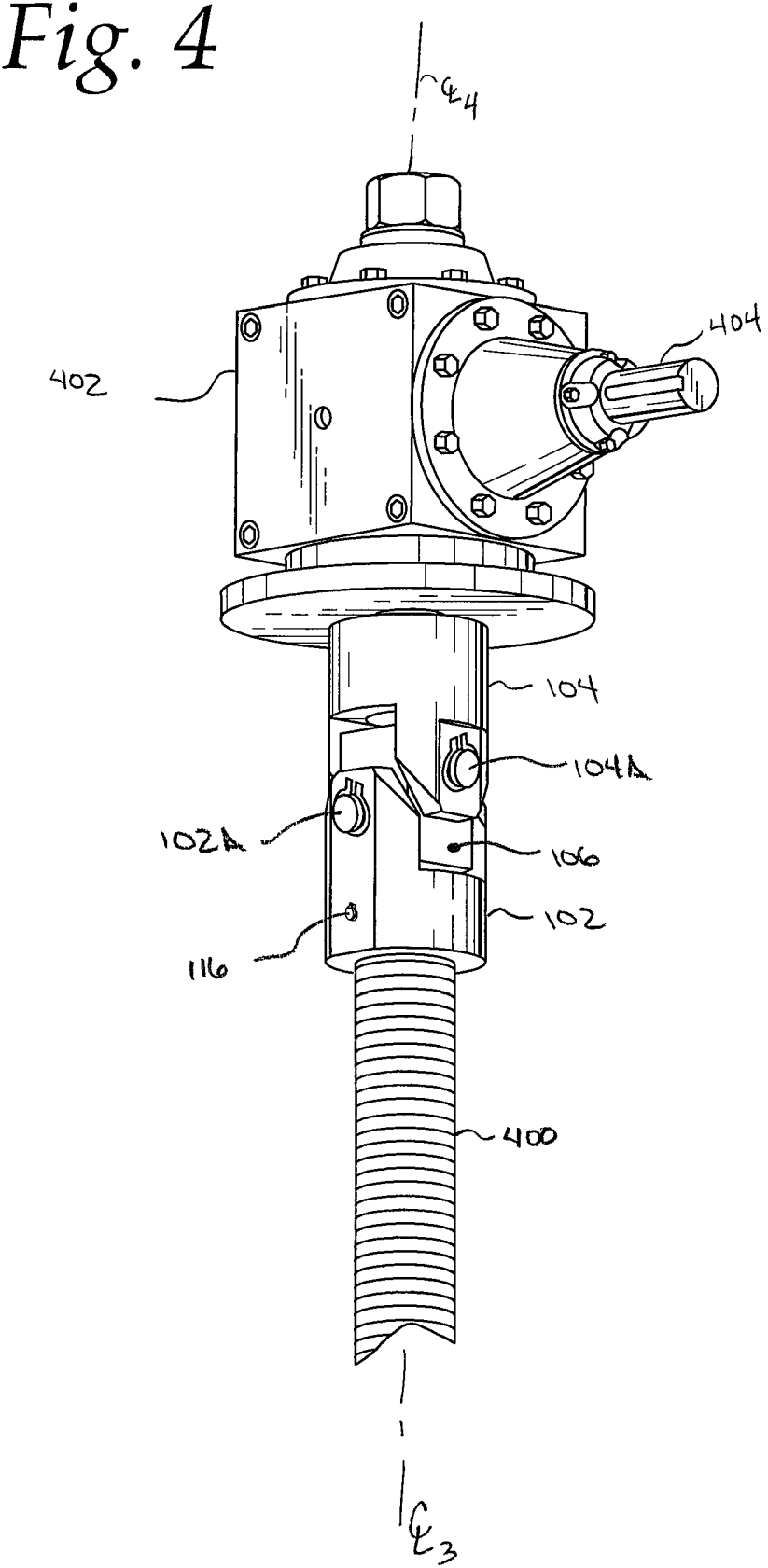
FIG. 4 illustrates an assembled perspective view of the exemplary jack screw connector coupled to a jack screw and gear box.

The lower clevis 102 may support a female threaded portion 114 for connecting to a jack screw 400 (see FIG. 4). The upper clevis 104 may include or cooperate with a load bolt 200 (see FIG. 2) having a keyed portion 202 and a threaded portion 204. The load bolt 200 may be configured to cooperate with a gear box 402 (see FIG. 4) and convey a load between the lower and upper devises 102, 104. A locking pin 116 may be bored through the lower clevis 102 and configured to engage and secure the jack screw 400 when cooperating with the female threaded portion 114. In an alternate embodiment, the locking pin 116 may be replaced with a set screw (not shown). The set screw (not shown) may cooperate with a tapped through-hole provided in the lower clevis 102. The set screw (not shown) may be arranged to engage and secure the jack screw 400 and/or a tapped hole (not shown) provided within the jack screw 400.

FIG. 3 illustrates an exploded perspective view of the exemplary jack screw connector 100. The lower clevis 102 supports and carries the eye block 106 between the legs 300, 302 that define the U-shape. The eye block 106 is sized such that the legs 300, 302 of the lower clevis 102 and the legs 304, 306 are slidable and pivotable relative to the outer surfaces of the eye block 106 while supporting the pins 102A and 104A carried within the orthogonally oriented through-bores 308, 310, respectively. The surface of the through-bores 308, 310, the surface of the pins 102A and 104A and any other surface that may experience friction, can be coated with, for example, a 0.0007" MICROLON® 1052 coating to reduce frictional wear thereon.

The load bolt 200 may include a load bolt head 312 formed distal to the threaded portion 204. A keyway 314 sized to accept a substantially rectangular key 316 may be formed adjacent to the load bolt head 312. The key 316 may be accepted within a mating keyway 318 formed in the upper clevis 104. The load bolt head 312, the keyway 314 and key 316 may cooperate with a countersunk portion 320 formed in the upper clevis 104.

FIG. 4 illustrates an assembled perspective view of the exemplary jack screw connector 100 coupled to the jack screw 400 and the gear box 402. In particular, the load bolt 200 is aligned and carried within the gear box 402 via a key (not shown) carried within the keyway 202 and a complimentary keyway (not shown) disposed within the interior of the gear box 402. In operation, the gear box 402 may be positioned such that axes $CL_3$ and $CL_4$ are substantially aligned. Any misalignment between the axis $CL_3$ and the axis $CL_4$ can be compensated for by the cooperation of the lower and upper devises 102, 104 about the eye block 106. In this way, a rotary input provided by an input shaft 404 may be converted and supplied by the gear box 402 to the jack screw 400.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims

What is claimed is:

1. A jack screw connector comprises:
   a first clevis including a pair of first clevis legs, wherein the first clevis is a connector including a countersunk portion configured to accept a load bolt head portion of a load bolt, the load bolt having a keyed portion configured to couple to a key of a gearbox on a hoist system;
   an eye block including a first bore and a second bore, wherein the first and second bores are formed offset and substantially perpendicular to each other;
   a first pin configured to be supported within the first bore and rotatably carried by the pair of first clevis legs when a first end of the eye block is carried therebetween;
   a second clevis including a pair of second clevis legs sized to engage a second end of the eye block; and
   a second pin configured to be supported within the second bore and rotatably carried by the pair of second clevis legs when aligned therewith; and
   wherein the first clevis legs are configured such that the first clevis receives a portion of the second clevis and the second clevis legs are configured such that the second clevis receives a portion of the first clevis, and wherein the first and second clevis legs do not have supporting structure between them.

2. The jack screw connector of claim 1, wherein the second clevis is a connector including a threaded portion.

3. The jack screw connector of claim 1, wherein the second clevis includes a locking pin.

4. A jack screw connector comprises:
   a first connector comprising a first clevis including first and second clevis legs, wherein the first connector includes a countersunk portion sized to accept a load bolt head portion of a load bolt, the load bolt having a keyed portion configured to couple to a key of a gearbox on a hoist system;
   an eye block including a first bore and a second bore, wherein the first and second bores are formed offset and substantially perpendicular to each other;
   a first pin configured to pivotably couple the first connector to the first bore of the eye block;
   a second connector comprising a second clevis including first and second clevis legs and sized to engage a second portion of the eye block; and a second pin configured to pivotably couple the second connector to the second bore of the eye block; and wherein the first connector is configured such that it receives a portion of the second connector and the second connector is configured such that it receives a portion of the first connector, and wherein the first and second clevis legs do not have supporting structure between them.

5. The jack screw connector of claim 4, wherein the second connector includes a threaded portion sized for connecting to a jack screw.

6. The jack screw connector of claim 4, wherein the second connector includes a locking pin.

7. A jack screw connector comprises:

a first connector comprising a first clevis including first and second clevis legs, wherein the first connector includes a countersunk portion sized to accept a load bolt head portion of a load bolt, the load bolt having a keyed portion configured to couple to a key of a gearbox on a hoist system;

a second connector comprising a second clevis including first and second clevis legs aligned substantially perpendicular and substantially coaxial to the first connector;

an eye block carried between the aligned first and second connector, wherein the eye block includes a first bore and a second bore formed offset and substantially perpendicular to each other;

a first pin configured to pivotably couple the first connector to the first bore of the eye block; and a second pin configured to pivotably couple the second connector to the second bore of the eye block; and wherein the first connector is configured such that the first connector receives a portion of the second connector and the second connector is configured such that the second connector receives a portion of the first connector, and wherein the first and second clevis legs do not have supporting structure between them.

\* \* \* \* \*